UNITED STATES PATENT OFFICE.

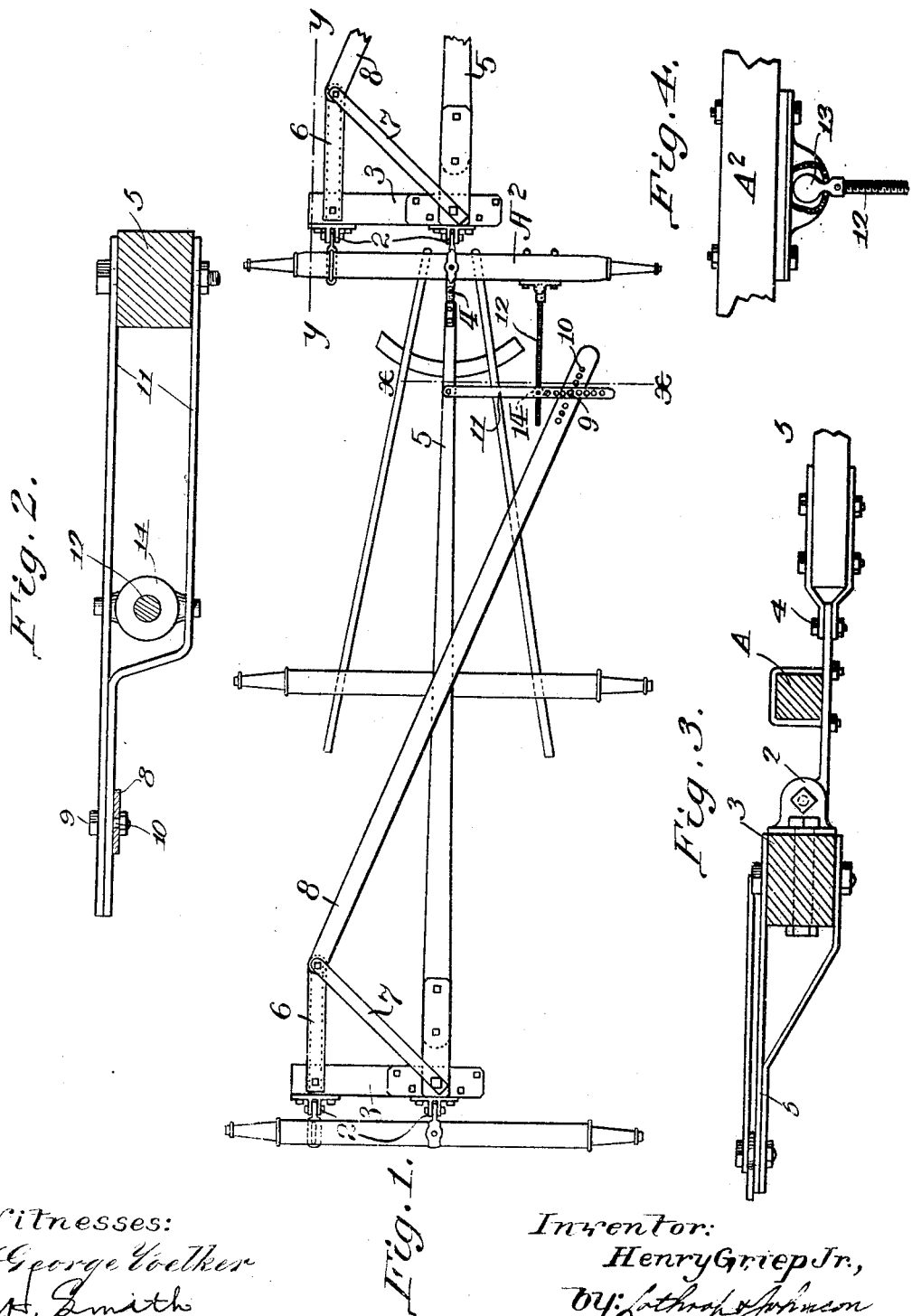

HENRY GRIEP, JR., OF LONG PRAIRIE, MINNESOTA, ASSIGNOR TO HANSMANN MANUFACTURING COMPANY, OF LONG PRAIRIE, MINNESOTA, A CORPORATION OF MINNESOTA.

ADJUSTABLE STEERING-POLE.

1,126,755.   Specification of Letters Patent.   Patented Feb. 2, 1915.

Application filed February 15, 1910. Serial No. 544,074.

*To all whom it may concern:*

Be it known that I, HENRY GRIEP, Jr., a citizen of the United States, residing at Long Prairie, in the county of Todd and State of Minnesota, have invented certain new and useful Improvements in Adjustable Steering-Poles, of which the following is a specification.

My invention relates to improvements in draft connections for coupling one vehicle behind another, including means whereby the path of travel of one vehicle may be automatically controlled from the next forward vehicle.

My invention is particularly designed for coupling a plurality of wagons, binders, etc., behind a traction engine so as to cause the attached vehicles or machines to travel in offset positions behind the engine.

To this end my invention consists in the features of construction, combination, and arrangement of parts hereinafter particularly described and claimed.

In the accompanying drawings forming part of this specification, Figure 1 is a plan view of my improved invention shown in use; Fig. 2 is a section on line $x$—$x$ of Fig. 1; Fig. 3 is a section on line $y$—$y$ of Fig. 1; and Fig. 4 is a detail of a portion of the adjusting mechanism.

Referring to the drawings A and $A^2$ represent axles forming the steering portions of successive vehicles. Detachably coupled upon the forward side of the axle, as by means of the couplings 2 is a cross bar 3. The couplings 2 are pivoted to allow vertical swinging of the cross bar. Having central pivotal connection 4 with the axle A is a draft pole connection 5 rigidly secured at its rear end to a second cross bar 3. The rear cross bar 3 may be connected to the axle of a vehicle at the rear in the same manner that the front cross bar is connected to the axle A.

In order to automatically control the travel of one steering frame from the steering frame in front I provide the following mechanism: Pivotally supported upon the outer and inner ends respectively of the cross bar are forwardly extending lever arms 6 and 7, said lever arms being brought together at their forward ends and pivotally connected to a bar 8. The bar 8 has adjustable connection at its forward end as by means of a pin 9 and openings 10 with the outer end of an arm 11 pivotally supported upon the draft pole 5. A rod 12 has ball and socket support 13 upon the inner side of the axle A and is threaded at its free end through a nut 14 swiveled between the upper and lower plates of the arm 11. Thus in operation as the steering frame of one vehicle is turned, turning with it the attached cross bar 3, the steering frame of the next vehicle in the rear will be similarly turned in an opposite direction through the medium of the connecting lever mechanism. As indicated in the drawings the mechanism may be so adjusted that one vehicle will travel directly behind the other and the connecting mechanism simply come into play in turning corners. The mechanism may be adjusted by means of the pin and opening connection 10, or the adjusting screw rod connection 12, or both, to so extend or shorten the connecting lever mechanism that the vehicle in the rear will be drawn in offset position at either side of the forward vehicle desired. This becomes of particular advantage, as in drawing a plurality of binders where it is desired to have each succeeding binder cut a swath at one side of the forward binder both in traveling across the field and in turning corners.

While I have shown my invention arranged in connection with the steering axles of such vehicles as wagons I do not restrict myself to such particular use or arrangement and may adapt the invention as an adjustable coupling wherever it is desired to draw one vehicle behind another and to automatically control the travel of one from the other.

I claim as my invention:

1. In combination with the steering portions of vehicles arranged in series, a draft member connecting the steering portions of successive vehicles, a lever arm carried by the steering portion of one vehicle upon one side of said draft member, an opposed part connected with the steering portion of the next vehicle upon the opposite side of said draft member, and a bar connecting said lever arm and opposed part.

2. In combination with the steering portions of vehicles arranged in series, a draft member connecting the steering portions of successive vehicles, a lever arm carried by the steering portion of one vehicle upon one side of said draft member, an opposed part connected with the steering portion of the next vehicle upon the opposite side of said draft member, and a bar pivotally connected with said lever arm and adjustably connected with said opposed part.

3. In combination with the steering portions of vehicles arranged in series, a draft member connecting said steering portions, means coöperating with said draft member to hold said vehicles in relatively offset positions consisting of a bar, a support for one end of said bar carried by the steering portion of one vehicle at one side of said draft member, and a support for the opposite end of said bar connected with the steering portion of the next vehicle upon the opposite side of said draft member.

4. In combination with the steering portions of vehicles arranged in series, a draft member connecting said steering portions, means coöperating with said draft member to hold said vehicles in relatively offset positions consisting of a bar, a support for one end of said bar carried by the steering portion of one vehicle at one side of said draft member, and an adjustable support for the opposite end of said bar connected with the steering portion of the next vehicle upon the opposite side of said draft member.

5. In combination with the steering portions of vehicles arranged in series, a draft member connecting said successive steering portions, a bar extending from side to side of said draft member, a support for one end of said bar upon the rear steering portion at one side of said draft member, and an adjustable connection between the opposite end of said bar and draft member.

6. In combination with the steering portions of vehicles arranged in series, a draft member connecting said successive steering portions, a bar extending from side to side of said draft member, a support for one end of said bar upon the rear steering portion at one side of said draft member, and an adjustable connection between the opposite end of said bar and draft member and between said bar and front steering portion.

In testimony whereof I affix my signature in presence of two witnesses.

HENRY GRIEP, Junior.

Witnesses:
Wm. L. Lee,
Peter J. Peterson.